UNITED STATES PATENT OFFICE.

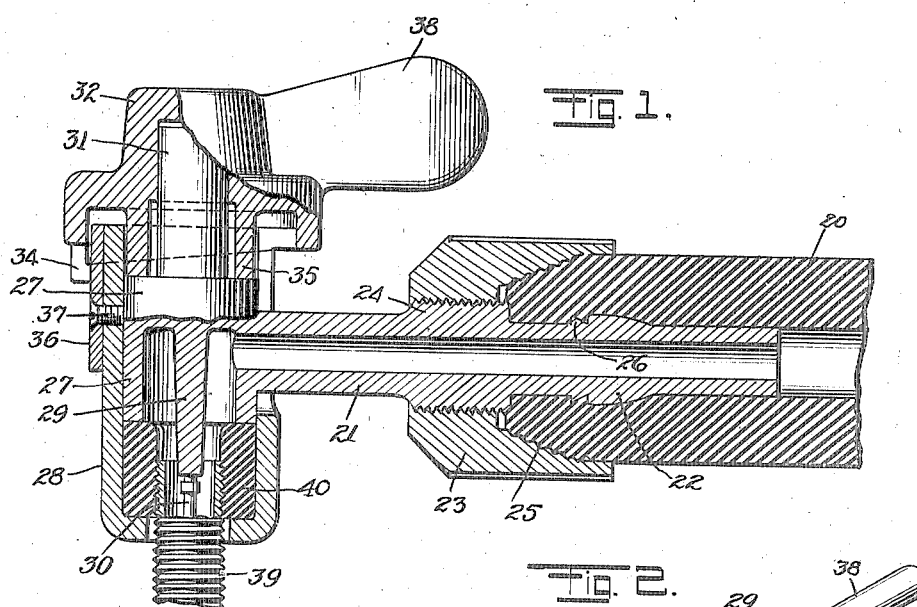
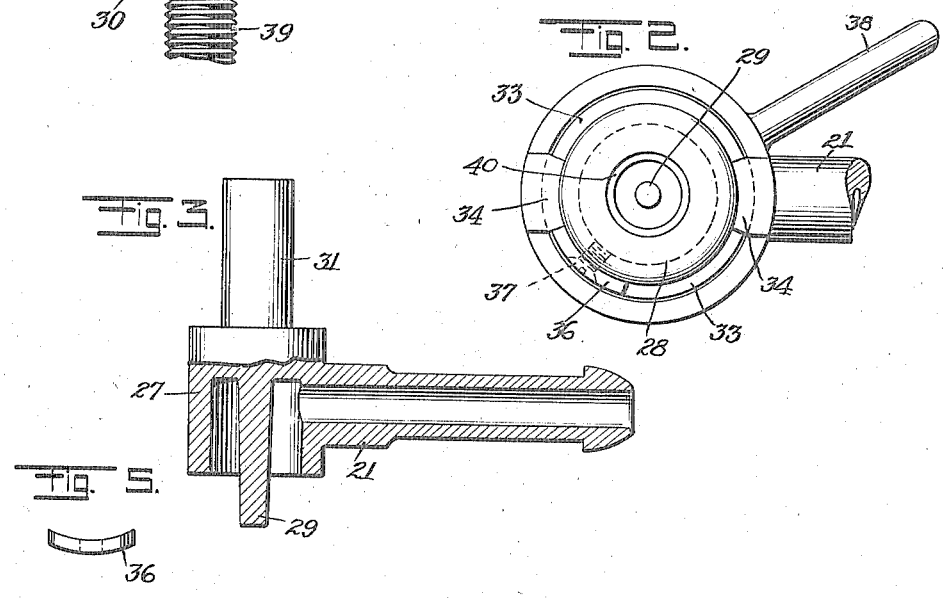
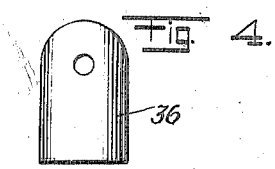

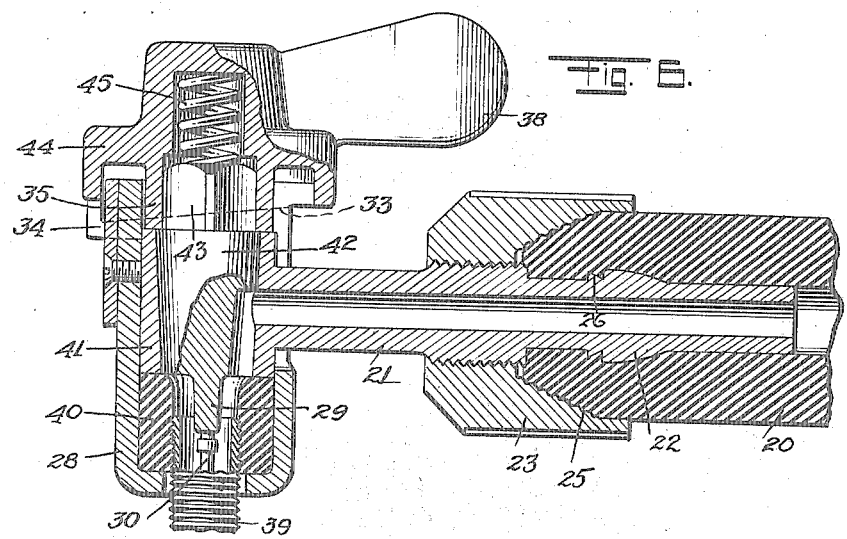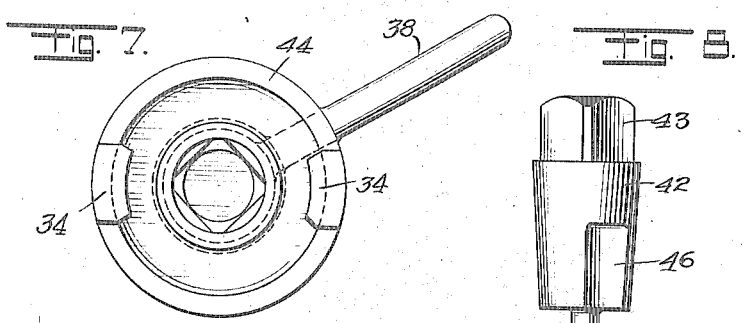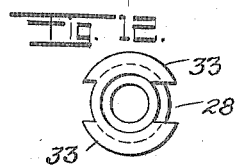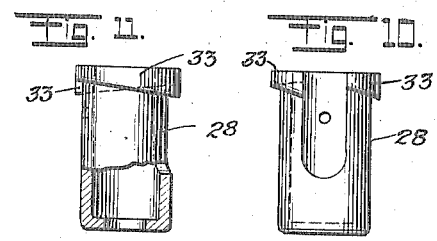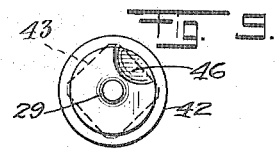

WILLIAM O. VIVARTTAS, OF WEEHAWKEN, NEW JERSEY.

COMPRESSED-AIR-PIPE COUPLING.

1,345,520.   Specification of Letters Patent.   Patented July 6, 1920.

Application filed February 10, 1920. Serial No. 357,737.

*To all whom it may concern:*

Be it known that I, WILLIAM O. VIVARTTAS, a citizen of the United States, and a resident of Weehawken, in the county of Hudson and State of New Jersey, have invented certain new and useful Improvements in Compressed-Air-Pipe Couplings, of which the following is a full, clear, and exact description.

Among the principal objects which the present invention has in view are: to operatively connect a supply pipe for compressed air to a pneumatic valve stem securely and rapidly; to simplify the operation of attaching and detaching the coupling in service; to avoid detachment or loss by separation of the parts of the coupling; to simplify and cheapen the cost of constructing the coupling; and to provide a union for said coupling and the flexible pipe with which it is associated for avoiding the crowding or crumbling of the material of which the flexible pipe is constructed, when united in service to a coupler.

*Drawings.*

Figure 1 is a vertical section of a coupling of the character mentioned, constructed and arranged in accordance with the present invention, the parts being shown as in active service.

Fig. 2 is an end view of the coupling.

Fig. 3 is a detail view showing in separated relation the coupling plunger.

Figs. 4 and 5 are detail views showing the side and top of the locking plate with which the coupler is provided.

Fig. 6 is a vertical longitudinal section showing a modified form of the coupling constructed and arranged in accordance with the present invention.

Fig. 7 is a top plan view of the modified form of the coupler, the operating cap therefor being removed.

Figs. 8 and 9 are detail views looking from the side and end, respectively, of the plug valve used in the modified form.

Figs. 10, 11 and 12 are views showing the container of the plug valve.

*Description.*

The service for which these couplings are especially designed is that incident to the practice in garages where tires of automobiles are being inflated by means of compressed air. The service pipe 20 is of suitable length and constructed from any suitable material such as heavy rubber. A stem 21 is furnished by the coupler construction which has a knob 22 over which the pipe 20 is stretched.

In the present form a knurled cap nut 23 is used for clamping the end of the pipe 20 for producing a firm grip of the said pipe on the stem 21 and on the knob 22 thereof. To this end the stem 21 has an enlargement 24, the surface whereof is threaded to engage threads in the solid portion of the nut 23. The nut 23 has formed in the end thereof a cup-shaped opening the sides of which are inwardly tapered, and a screw-thread 25 is produced thereon. The inner side or rise of the knob 22 has a grooved portion 26, the grooves whereof are turned toward the enlargement 24.

It is obvious that when the nut 23 is secured forward over the end of the pipe 20, the threads 25 thereof sink into the texture of the said pipe and operate to draw the same forward, the pitch of the thread 25 being greatly in excess of the pitch thread on the enlargement 24.

It is also obvious that as the end of the pipe 20 is drawn into the nut 23, the inner surface of the said pipe engages and is thereafter held by the grooves on the knob 22.

In the simpler form of the invention shown in Figs. 1 to 5 inclusive, the stem 21 is integrally connected to an open-ended tubular head 27. The head 27 is cylindrical and slidably fits a container cup 28.

The head 27 is equipped with a centrally-extended thrust pin 29, the function of which is to engage the plunger 30 of a Schroeder valve for unseating the same when the head 27 is forced toward the bottom of the cup 28. At the opposite side of the head 27, a guide extension 31 forms a guide for an operating cap 32 which operatively engages the cams 33 on the upper edge of the cup 28. To this end the cap 32 has dependent inturned hooks 34 which extend beneath and ride on the cam surfaces of the cams 33 when the cap is revolved.

In assembling the coupling, the cap 32 is depressed over the extension 31 so that the cylindrical flange 35 of the said cap rests firmly on the top of the head 27. The hooks 34 pass between the ends of the cams 33 and extend under the lower portions of the said cam when turned away from the opening between. To prevent the separation of the cap 32 from the cup 28, a stop plate 36 is introduced on the cup and is secured by the screw 37 permanently.

As seen best in Fig. 10 of the drawings, the plate 36 fills the space between the cams and thereafter prevents the registration of the hooks 34 with the openings between the cams.

For operating the cap 32 it is provided with an extension handle 38. When the assembly above mentioned has been made and the cap 32 is rotated to place the hooks 34 at the lowest portion of the cams 33, the coupling is placed over the end of the stem of a pneumatic valve 39 so that a rubber filler 40 surrounds the extremity of the said stem. In this position it is obvious if the cap 32 be rotated so that the hooks 34 ride down the incline of the cams 33, a pressure is applied by means of the flange 35 on the head 27 which is caused to move lengthwise of the cup 28 to compress between the end of the said cup and the lower edge of the head 27 and the filler 40. The compression on the filler 40 distends the same inwardly crowding the rubber hard against the terminus of the stem 39 to grip the same to prevent the subsequent dislodgement thereof, and at the same time form an air-tight joint with the said stem. In this position it is obvious that if air be introduced through the pipe 20 and stem 21, the same will be delivered to the pneumatic tube with which the stem 39 is associated, due to the fact that with the depression of the head 27, the pin 29 has unseated the valve connected with the plunger 30.

When sufficient air has been admitted, the supply is discontinued and the cap 32 reversely rotated with the result that the head 27 moves toward the opposite end of the cup 28, relieving the pressure of the pin 29 on the plunger 30 to permit the pneumatic valve of the stem 39 to close.

In the final movement of the head 27, the pressure is relieved on the filler 40 to permit the same to resume its normal position where the end of the stem 39 is free. The coupling may now be lifted from the stem 39.

In the modified form of the invention disclosed in Figs. 6 to 9 inclusive provision is made for closing the supply of air in the coupling and the supply pipe therefor, as the pneumatic valve in the stem 39 is permitted to close and as the compression is removed from the filler 40. In accomplishing this a tubular head 41 is substituted for the head 27.

The head 41 is open at both ends and has a tapered bore to form an air-tight seat for the tapered plug. The plug 42 has a plug wrench head extension 43 which is engaged by a modified cap 44. The cap 44 is hollowed at the crown to form a housing for a spiral spring 45 that normally presses upon the extension 43 to seat the plug 42 in the tapered bore of the head 41. In other respects the cap 44 is similar to the cap 32, in that it is provided with the hooks 34 which extend beneath the cam 33 upon the cup 28. Also the cap 44 has the cylindrical bearing flange 35 by which the head 41 and plug 42 contained therein are forced downward to compress the filler 40.

The plug 42 is best shown in Figs. 8 and 9 of the drawings. It is provided with a channel 46 adapted for registration with the opening in the stem 21. This registration of the channel 46 occurs only when the head 41 has been fully depressed to compress the filler 40 on the stem 39 and when the pin 29 has depressed the plunger 30 to unseat the pneumatic valve of the stem 39. When the cap 44 is retractively rotated to relieve the compression on the filler 40, the channel 46 is removed from rotation with the passage in the stem 21 which is thereafter tightly closed. In this way the need of a special device for shutting off the air in the pipe 20 is dispensed with.

*Claims.*

1. A coupling as characterized comprising, a head having a delivery air passage therethrough and adapted for service attachment to an air supply pipe; a container cup for said head; a resilient tubular filler permanently disposed in said cup in operative relation with said head; a cap rotatively mounted on said cup for moving said head to compress said filler; and means operatively uniting said cap and cup for moving said cap lengthwise of said cup when said cap is rotated.

2. A coupling as characterized comprising, a head having a delivery air passage therethrough and adapted for service attachment to an air supply pipe; a container cup for said head; a resilient tubular filler permanently disposed in said cup in operative relation with said head; a cap rotatively mounted on said cup for moving said head to compress said filler; and means operatively uniting said cap and cup for moving said cap lengthwise of said cup when said cap is rotated, said means embodying inclined members mounted on said cap and cup, said members coöperating to contract the total length of the coupling for compressing said filler.

3. A coupling as characterized comprising, a head having a delivery air passage therethrough and adapted for service attachment to an air supply pipe; a container cup for said head; a resilient tubular filler permanently disposed in said cup in operative relation with said head; a cap rotatively mounted on said cup for moving said head to compress said filler; means operatively uniting said cap and cup for moving said cap lengthwise of said cup when said cap is rotated, said means embodying inclined members mounted on said cap and cup, said members coöperative to contract the total length of the coupling for compressing said filler; and means for locking said members in operative relation.

4. A coupling as characterized comprising, a head having a delivery air passage therethrough and adapted for service attachment to an air supply pipe; a container cup for said head; a resilient tubular filler permanently disposed in said cup in operative relation with said head; a cap rotatively mounted on said cup for moving said head to compress said filler; and means operatively uniting said cap and cup for moving said cap lengthwise of said cup when said cap is rotated, said means embodying a plurality of cams and hooks engaging the same for drawing the cap and cup together.

5. A coupling as characterized comprising, a head having a delivery air passage therethrough and adapted for service attachment to an air supply pipe; a container cup for said head; a resilient tubular filler permanently disposed in said cup in operative relation with said head; a cap rotatively mounted on said cup for moving said head to compress said filler; means operatively uniting said cap and cup for moving said cap lengthwise of said cup when said cap is rotated; and means for locking said head and pipe, said means embodying an internally threaded cap nut, the threads operating to draw the pipe toward said head.

6. A coupling as characterized comprising, a head having a delivery air passage therethrough and adapted for service attachment to an air supply pipe; a container cup for said head; a resilient tubular filler permanently disposed in said cup in operative relation with said head; a cap rotatively mounted on said cup for moving said head to compress said filler; means operatively uniting said cap and cup for moving said cap lengthwise of said cup when said cap is rotated; a stem integrally constructed on said head for attachment with said supply pipe; and a cap nut for locking said stem and pipe, said nut operatively engaging said stem by a fine pitched screw thread and having a coarse thread for embedding in to engage said pipe.

7. A coupling as characterized comprising, a head having a delivery air passage therethrough and adapted for service attachment to an air supply pipe; a container cup for said head; a resilient tubular filler permanently disposed in said cup in operative relation with said head; a cap rotatively mounted on said cup for moving said head to compress said filler; means operatively uniting said cap and cup for moving said cap lengthwise of said cup when said cap is rotated; a stem integrally constructed on said head and having a bulbous portion for engaging the inner wall of said pipe; and a cap nut for locking said pipe on said stem, said nut having a tapered opening for extension over to contract said pipe, and a screw thread for feeding said cap toward said bulbous portion of said stem.

8. A coupling as characterized comprising, a head having a delivery air passage therethrough and adapted for service attachment to an air supply pipe; a container cup for said head; a resilient tubular filler permanently disposed in said cup in operative relation with said head; a cap rotatively mounted on said cup for moving said head to compress said filler; means operatively uniting said cap and cup for moving said cap lengthwise of said cup when said cap is rotated; and means for closing the air passage in said head coincident with the retraction thereof.

9. A coupling as characterized comprising, a head having a delivery air passage therethrough and adapted for service attachment to an air supply pipe; a container cup for said head; a resilient tubular filler permanently disposed in said cup in operative relation with said head; a cap rotatively mounted on said cup for moving said head to compress said filler; means operatively uniting said cap and cup for moving said cap lengthwise of said cup when said cap is rotated; and means for closing the air passage in said head coincident with the retraction thereof, said means embodying a shut-off plug rotatively mounted in said head, said plug being operatively engaged to be rotated with said cap.

10. A coupling as characterized comprising, a head having a delivery air passage therethrough and adapted for service attachment to an air supply pipe; a container cup for said head; a resilient tubular filler permanently disposed in said cup in operative relation with said head; a cap rotatively mounted on said cup for moving said head to compress said filler; means operatively uniting said cap and cup for moving said cap lengthwise of said cup when said cap is rotated; means for closing the air passage in said head coincident with the retraction thereof, said means embodying a shut-off plug rotatively mounted in said head, said plug being operatively engaged to be rotated with said cap; and resilient means disposed between said cap and plug to maintain the plug on its seat.

WILLIAM O. VIVARTTAS.